US008737261B2

(12) United States Patent
Schieder et al.

(10) Patent No.: US 8,737,261 B2
(45) Date of Patent: May 27, 2014

(54) NODE REGISTERING METHOD

(75) Inventors: Andreas Schieder, Würselen (DE);
Markus Kampmann, Aachen (DE);
Frank Hartung, Herzogenrath (DE);
Rene Rembarz, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 960 days.

(21) Appl. No.: 12/516,162

(22) PCT Filed: Nov. 27, 2007

(86) PCT No.: PCT/EP2007/062902
§ 371 (c)(1),
(2), (4) Date: Jan. 25, 2010

(87) PCT Pub. No.: WO2008/065122
PCT Pub. Date: Jun. 5, 2008

(65) Prior Publication Data
US 2010/0208616 A1    Aug. 19, 2010

(30) Foreign Application Priority Data

Nov. 27, 2006    (WO) ................. PCT/EP2006/068960

(51) Int. Cl.
*H04L 12/28*    (2006.01)
(52) U.S. Cl.
USPC ........... 370/254; 370/236; 370/338; 370/352; 370/389; 370/401; 709/206; 709/219; 709/238
(58) Field of Classification Search
CPC ................................................ H04L 29/12113
USPC ......... 370/236, 254, 338, 352, 389, 392, 400, 370/401; 709/206, 219, 238
See application file for complete search history.

(56) References Cited

U.S. PATENT DOCUMENTS

| | | | | |
|---|---|---|---|---|
| 5,825,759 | A | * | 10/1998 | Liu ............................. 370/331 |
| 5,946,311 | A | * | 8/1999 | Alexander et al. ....... 370/395.53 |
| 6,498,795 | B1 | * | 12/2002 | Zhang et al. .................. 370/400 |
| 6,549,522 | B1 | * | 4/2003 | Flynn ............................ 370/313 |
| 6,618,764 | B1 | * | 9/2003 | Shteyn .......................... 709/249 |
| 7,032,031 | B2 | * | 4/2006 | Jungck et al. ................. 709/246 |
| 7,257,104 | B2 | * | 8/2007 | Shitama ....................... 370/338 |
| 7,339,937 | B2 | * | 3/2008 | Mitra et al. ............. 370/395.53 |
| 7,506,370 | B2 | * | 3/2009 | Aggarwal ....................... 726/14 |
| 7,561,535 | B2 | * | 7/2009 | Naqvi et al. .................. 370/260 |
| 7,586,899 | B1 | * | 9/2009 | Mohaban et al. ............. 370/352 |
| 7,596,152 | B2 | * | 9/2009 | Yarvis et al. .................. 370/503 |
| 7,643,458 | B1 | * | 1/2010 | Talwar et al. ................. 370/338 |
| 7,660,881 | B2 | * | 2/2010 | Thanh et al. .................. 709/223 |

(Continued)

OTHER PUBLICATIONS

Bengt Ahlgren et al: "A Node Identity Internetworking Architecture" INFOCOM 2006. 25$^{TH}$ IEEE International Conference on Computer Communications Proceedings, IEEE, PI, Apr. 1, 2006.

(Continued)

*Primary Examiner* — Andrew Lai
*Assistant Examiner* — Andrew C Lee

(57) ABSTRACT

A method is described for registering a node of an underlying network at an overlay network, characterized in that the node of the underlying network registers at a registration node which initiates a propagation of registration information towards the overlay network.

30 Claims, 14 Drawing Sheets

(56) References Cited

U.S. PATENT DOCUMENTS

| | | | |
|---|---|---|---|
| 7,715,396 B2* | 5/2010 | Castro et al. | 370/392 |
| 8,050,182 B2* | 11/2011 | Yamamoto et al. | 370/242 |
| 8,233,489 B2* | 7/2012 | Welin et al. | 370/395.32 |
| 8,365,301 B2* | 1/2013 | Miller | 726/28 |
| 2003/0021275 A1* | 1/2003 | Shabeer | 370/393 |
| 2004/0054807 A1* | 3/2004 | Harvey et al. | 709/243 |
| 2004/0085912 A1* | 5/2004 | Xu et al. | 370/254 |
| 2004/0179481 A1* | 9/2004 | Graupner | 370/254 |
| 2005/0010653 A1* | 1/2005 | McCanne | 709/219 |
| 2005/0015511 A1* | 1/2005 | Izmailov et al. | 709/238 |
| 2005/0083834 A1* | 4/2005 | Dunagan et al. | 370/221 |
| 2005/0086469 A1* | 4/2005 | Dunagan et al. | 713/163 |
| 2005/0152286 A1* | 7/2005 | Betts et al. | 370/255 |
| 2006/0002328 A1* | 1/2006 | Naghian | 370/328 |
| 2006/0009213 A1* | 1/2006 | Sturniolo et al. | 455/426.1 |
| 2006/0039371 A1* | 2/2006 | Castro et al. | 370/389 |
| 2006/0080410 A1* | 4/2006 | Maclarty et al. | 709/220 |
| 2006/0174037 A1* | 8/2006 | Bernardi et al. | 709/245 |
| 2006/0190716 A1* | 8/2006 | Miller | 713/150 |
| 2006/0191020 A1* | 8/2006 | Miller | 726/28 |
| 2007/0038759 A1* | 2/2007 | Hanson et al. | 709/227 |
| 2007/0091828 A1* | 4/2007 | Ashwood-Smith | 370/256 |
| 2007/0112578 A1* | 5/2007 | Randle et al. | 705/1 |
| 2008/0130516 A1* | 6/2008 | You et al. | 370/254 |

OTHER PUBLICATIONS

Lawrence Cheng et al: "Service-aware Overlay Adaptation in Ambient Networks" Computing in the Global Information Technology, 2006. ICCGI '06. International Multi-Conference on IEEE. PI, Aug. 1, 2006.

Lakshminarayanan, Stoica, Wehrle: "Support for Service Composition in i3" ACM Multimedia '04, [Online] Oct. 10-16, 2004 pp. 1-6.

* cited by examiner

NODE REGISTERING METHOD

TECHNICAL FIELD

The present invention relates to the technical field of registering nodes of a network with a registering node, especially in the context of a network system comprising an underlying network and an overlay network.

BACKGROUND

In the following background information about the Node ID (MD) Architecture and the Service Aware Transport Overlays (SATO), both developed within the Ambient Networks project, will be given. This is an example of a network system comprising an underlying network and an overlay network.

In the so-called Ambient Networks (AN) project, which is an EU project under the 6-th framework programme, mechanisms have been developed to ensure global reachability across different locator domains. ANs are expected to provide a common control layer spanning multiple routing domains, which are assumed to exploit different mechanisms and technologies to transport data in their domains. In AN, these domains are referred to as locator domains. The nodes contained in these locator domains are assumed to possess locators, such as specific addresses arranged according to a given addressing scheme, which only have local significance and facilitate communication within the local domain only. Still, it should be understood that these local domains can also be rather large as the global IPv4 Internet is for example one of such locator domains.

To ensure communication across the boundaries of such locator domains, the AN project has developed a concept referred to as NodeID architecture. In this concept nodes wishing to communicate globally (i.e. beyond their own locator domain) register to a so-called NodeID router (NR) present in their local domain. The individual nodes register a node identifier called NodeID and their local locator, which is valid in the domain they are currently roaming in. The NR stores this information and propagates the NodeIDs of registered nodes upwards in the hierarchical topology of interconnected locator domains. The final step is to store the NodeID in a so-called Distributed Hash Table (DHT) present in the top-level locator domain. FIG. 2 shows an example of a high-level picture of the NodeID architecture, where three locator domains LD1, LD2 and LD3 are shown, each having its own Domain Name Service (DNS). In this example, LD1 is assumed to be the Internet Protocol version 4 Core (IPv4 Core).

Communication across different locator domains between two nodes "A" and "B" (see FIG. 2 and FIG. 3, which shows the communication steps within the example of FIG. 2) may be achieved as follows:
1. Node "A" wishing to communicate with Node "B" resolves node "B"s Universal Resource Identifier (URI) by contacting the DNS as it would already do in today's Internet, The DNS response will include Node "B"s NodeID.
2. Node "A" creates a connection setup message or a first data packet that contains the NodeID of Node "B"
3. The message is passed up the hierarchy of NID Routers, which are identified per domain as default NID gateways for locally unknown NodeIDs. In LD2 the default NID Router (NR) is NR2.
4. When the message reaches the top level domain (LD1 in the example), the DHT provides a mapping to the NID router representing an entry to the locator domain subtree to which Node "B" belongs. The message is forwarded to this NID Router (NR3 in the example of FIG. 2),
5. The NID routers, present in the sub-tree to which Node "B" belongs, store information about the next hop NR or already have information about the locator of Node "B" if they happen to be the NR serving the locator domain to which Node "B" belongs. Based on the information present in the NRs, the message is passed down in the hierarchical topology of Locator Domains.
6. The NR serving the locator domain in which Node "B" is present has knowledge about the locator of Node "B". This locator is used to finally deliver the message to Node "B".

A NodeID architecture may provide a form of mobility support. The topology of interconnected locator domains as depicted in FIG. 2 and FIG. 3 is subject to change whenever networks physically move (network and device mobility) or cooperation agreements between networks change. In AN, these co-operation agreements are referred to as composition agreements and an automated process takes care of negotiating, agreeing and implementing these cooperation agreements dynamically to react on changed user demands or network offerings.

It is thus expected that changes in the network topology happen rather frequently. This requires having efficient mechanisms at hand which allow updating the distributed routing information stored in the NRs and the DHT. This may also apply to other information in the network, e.g. the information contained in the so-called SPI, which will be introduced in the next section.

The support for mobility in the NodeID architecture is implemented by a set of signaling procedures that allow moving sub-trees within the topology from one point of attachment to another one. This ensures that the global tree always contains up-to-date information.

The tree structure formed by the interconnected locator domains also has the advantage that mobility updates can be kept locally and usually don't require propagating the change up to the top-level domain.

The NodeID architecture is also described in Bengt Ahlgren, Jari Arkko, Lars Eggert and Jarno Rajahalme, "A Node Identity Internetworking Architecture", IEEE INFOCOM 2006 Global Internet Workshop Apr. 28-29, 2006, such that a further description is not necessary here.

Ambient Networks may provide media delivery concepts. Within the Ambient Networks project, the concept of Service Aware Transport Overlays (SATO) has been developed. With a SATO overlay network, overlay nodes (called SATO Overlay Nodes or SON) are interconnected. Such overlay nodes will host the so-called SATOPorts (SP). Typically, the SATO-Ports will perform functions in the user plane of a service. The user plane SATOPorts may be broadly classified into three main classes and a number of different sub-classes based on functionality, although some may fall into more than one class. The first major class is 'routers', which performs plain data forwarding at the overlay level based on dynamically configured overlay routing tables. This class of SATOPort is primarily employed to enhance QoS by mitigating the risk of sub-optimal or sub-standard network level routing in a similar manner. The second major class of SATOPorts is 'processors', which performs a given processing on an incoming data stream, for example, virus-scan, integrity checking, transcoding, resiting, synchronisation, etc. The third major class of SPs is 'caches' which is capable of storing data flows for time-shifted delivery.

One or multiple end devices will fulfil the role of clients and one or multiple of a server. Whereas in some service scenarios the roles are not that clear distinguishable, i.e., in pure peer-to-peer services where any party is client and server at the same time. The clients are called SATOClient (SC) and the servers are called SATOServer (SS).

A very simple configuration of a SATO is the combination of one SATOServer, one SATOPort, and one SATOClient. However, more complex configurations may involve multiple SATOServers (e.g., two media content sources), multiple SATOPorts (e.g., transcoder, caches, synchronizer), and multiple SATOClients (e.g., receiving multicast content).

All of these elements form a SATO on top of the underlying network infrastructure, as shown in FIG. 4. As can be seen, an overlay network (such as for example a SATO) may comprise at least a part of the nodes of an underlying network (e.g. the actual physical network), and may thereby form a virtual network on top of the underlying network.

The lookup of media processing functions located in the network is performed by a directory function called SATO-Port Informationbase (SPI). Two possible means of implementing this function are with a database-like directory service, or with an ad-hoc search. Considering the database approach and taking into account that a centralised architecture could have scalability limitations, the SPI could be designed as a distributed database where each Overlay Node (ONode) hosts a part of the database service.

Several levels of SATOPort descriptions have been identified. The higher level refers to the general properties of the SATOPort, such as which kind of service it can provide, e.g. caching or adaptation. In the latter case additional information about supported codecs has to be given. It is also relevant for routing decisions to have information about the current available capabilities of the MP as present in the lower level of description. The current processor load of a transcoding device or the remaining memory capacity of a cache is an example for that. When up and running, each ONode registers the availability of the SPs that it hosts in the SPI. After this registration, the information is updated if the status of any indexed SPs changes.

There are problems with such existing solutions. Overlay Networks create a logical network of nodes, which cooperate to implement a service of common interest. Typical examples of such services are file-sharing and enterprise networks (VPN). Overlays can be set up for any purpose, including the distribution of media content. In the Ambient Networks project, overlay networks are a topic since the start of project phase 1 in Jan. 2004 (see above).

Known solutions discussed inside and outside the AN project face the difficulty to consider information about the underlying network topology for the routing decisions made in the overlay. The motivation for considering such information is to avoid inefficient routing decisions in the overlay leading to unnecessarily long data paths. Typical solutions to this problem rely on the exploitation of IP path metrics, which can easily be discovered or measured. Typical examples for such metrics are number of hops and ping-delays.

The overlay concept discussed in the AN project is challenged additionally as the underlying network topology is assumed to dynamically change over time due to user and network mobility and the creation and termination of network composition agreements. This leads to a varying availability of communication paths.

Apart from the need to make information about the underlying network topology available to the overlay nodes, information about the capabilities of individual nodes is required, in particular the capabilities that go beyond the mere forwarding of data (e.g. media manipulation, caching). As outlined above, a distributed database (the SPI) is foreseen to store such data. This database is consulted to discover available and suitable overlay nodes when an overlay network needs to be set-up or adapted. The current approach assumes that the nodes register to this database and store and update the information about their capabilities. A second possibility discussed in the AN project is to search in the network for suitable nodes during the set-up of an overlay network.

All these approaches spend a considerable effort on collecting and maintaining such data and also generate signaling traffic in order to maintain the database or execute the search functions. At the same time, topology information and the support for mobility is already present in the network. In addition, the consistency of different databases (e.g. consistency with the NID DHT) has to be ensured. This is the area where this invention is supposed to improve efficiency.

The existing approach in AN (NID architecture) guarantees reachability of nodes across locator domains. Limited knowledge of topology is present in the NID architecture as distributed information (NID router knows its leaf routers and the router one layer higher in the hierarchy). Procedures to update attachment of LD to NID tree exists.

FIG. 5 shows the so far separated concepts of overlay routing and overlay information stored in the SPI on the overlay layer, and addressing and routing in Locator Domains in the Physical network. In the example, the underlying network is a physical network and the overlay network is a SATO. There may be a relation in so far that physical nodes in the Physical network (thus participating in NID addressing and routing) may also be part of an Overlay network on the Overlay layer. This is shown through the solid lines in FIG. 5. Also, the SPI database available on the overlay layer may be implemented in one or more physical boxes/nodes in the Physical network (if the SPI is implemented in several nodes, it is a distributed SPI; see the dotted lines). The nodes may be in different locator domains (LDs).

FIG. 6 shows the mechanisms of Overlay and Locator Domain registration in the prior art example of FIG. 5, which are independent of one another.

In the shown case, registration, addressing, and routing on the Physical layer, and registration and routing on the Overlay layer, are unrelated, as also shown in FIG. 6. On the physical layer, the node registers itself when attaching to the network, by registering its LD independent FQDN (Fully Qualified Domain Name), its LD independent node identity (NID), and its LD local address. On the overlay layer, the overlay node A (which physically coincides with the just described physical node A) separately registers its FQDN and its overlay node capabilities (like transcoding capabilities, or supported codecs if it is a client) with the SPI in the overlay network.

SUMMARY

The object of the present invention is to provide an improved method of node registration within a system having an underlying network and an overlay network.

This object is solved by the subject-matter of the independent claims. Advantageous embodiments are described in the dependent claims.

According to an embodiment of the invention, a method for registering a node of an underlying network at an overlay network is provided, characterized in that the node of the underlying network registers at a registration node which initiates a propagation of registration information towards the overlay network.

In the context of AN, an application of a basic concept of this invention is to utilize the procedures and mechanisms present in the AN architecture to ensure global reachability across different locator domains (NodeID Architecture) to update the SPI. In other words, it is generally proposed to make use of registration information provided to a registration node in the underlying network for purposes of node registration in the overlay network. In this way, the invention proposes to transcend the network layering provided by underlying and overlay network, in order to arrive at a very flexible and efficient system.

Important advantages can be achieved by embodiments of the invention. Among these are especially:

An optimization of the registration process in the two independent networks, i.e. the underlying and the overlay network, making one registration (the one on the overlay layer) unnecessary. One may use one registration instead of two, as needed today. This also greatly facilitates the update of information, e.g. in case of mobility events.

The registration now may also provides topology information into the overlay network, e.g. the SPI, which helps to optimize the selection and deployment of overlay nodes, since the topology of the underlying network can now be taken into consideration much better.

BRIEF DESCRIPTION OF DRAWINGS

In the following detailed examples of the invention will be described with reference to the Figures, in which.

DETAILED DESCRIPTION

The following detailed description will generally make reference to examples taken from the above described AN and SATO context, which is also a field of preferred application of the concepts of the present invention, However, it will be noted that it is apparent to the skilled person that the inventive concepts of the invention may generally be embodied in further networks comprising an overlay and underlying layer structure, in which registration operations take place.

Figure 1:
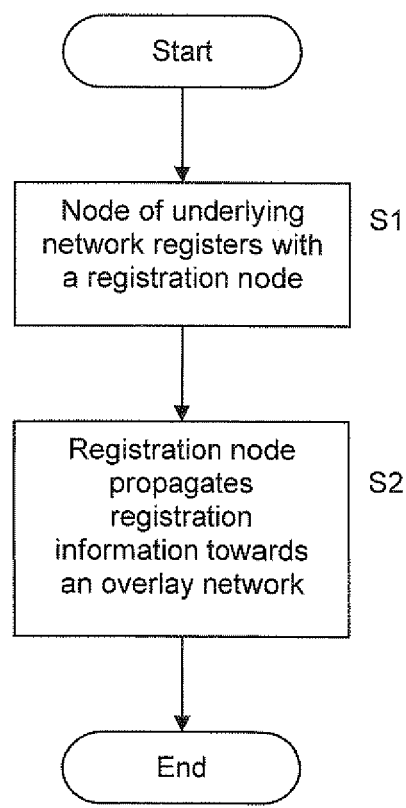
FIG. 1 shows a flow chart of a basic method embodiment of the invention.
Figure 2:
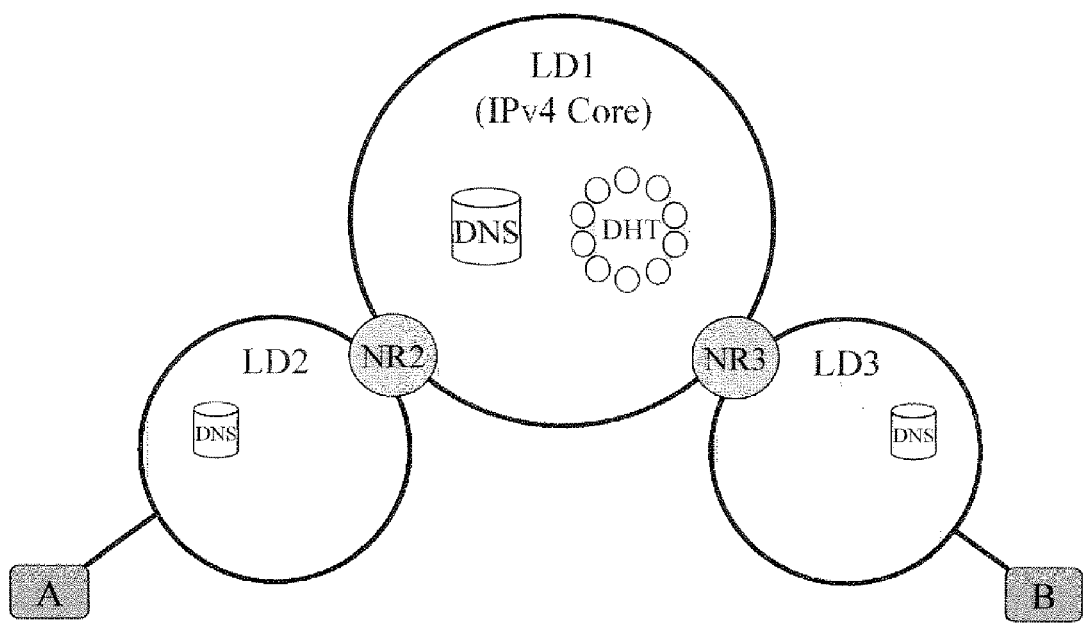
FIG. 2 shows an overview of the Ambient Network NodeID architecture and its key components
Figure 3:
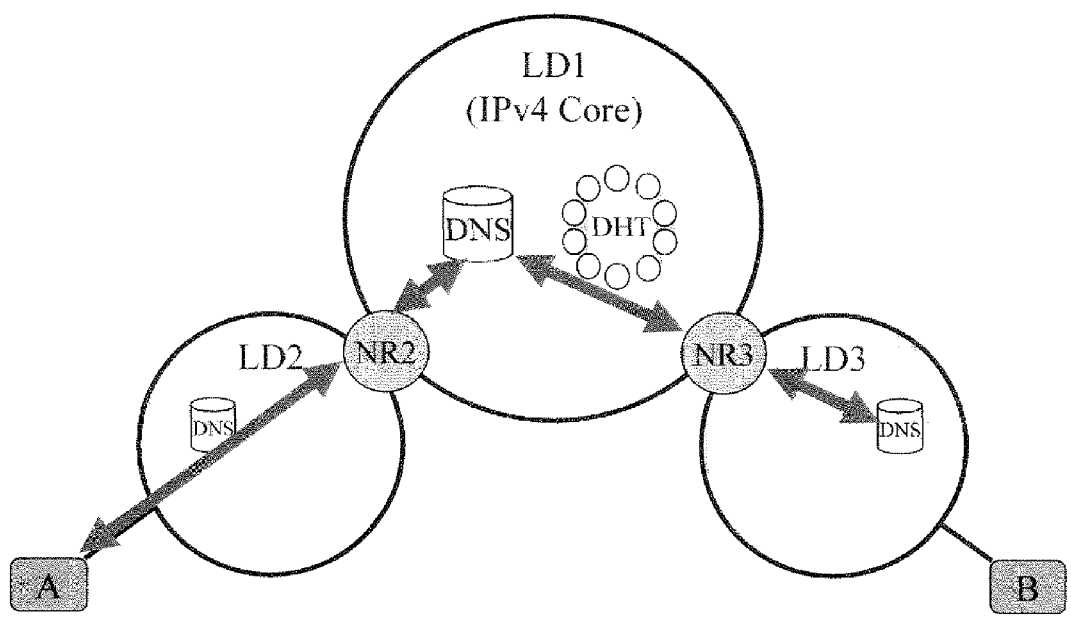
FIG. 3 shows communication across locator domains of FIG. 2 facilitated by NID routers and a DHT present in the top-level locator domain.
Figure 4:
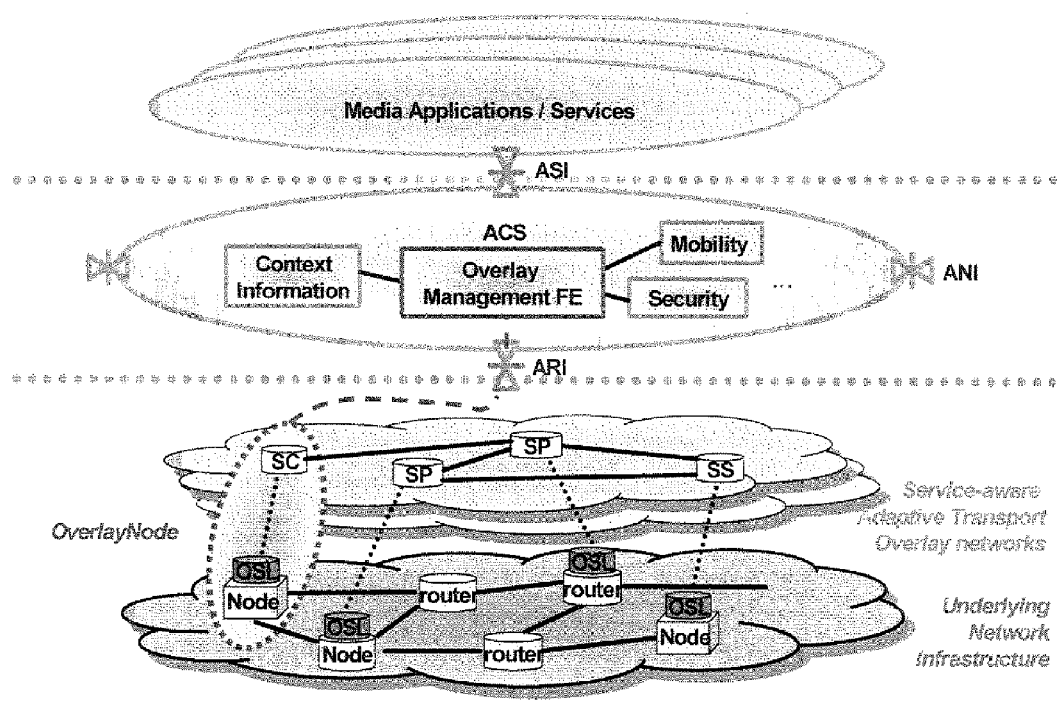
FIG. 4 shows a SATO network architecture.
Figure 5:
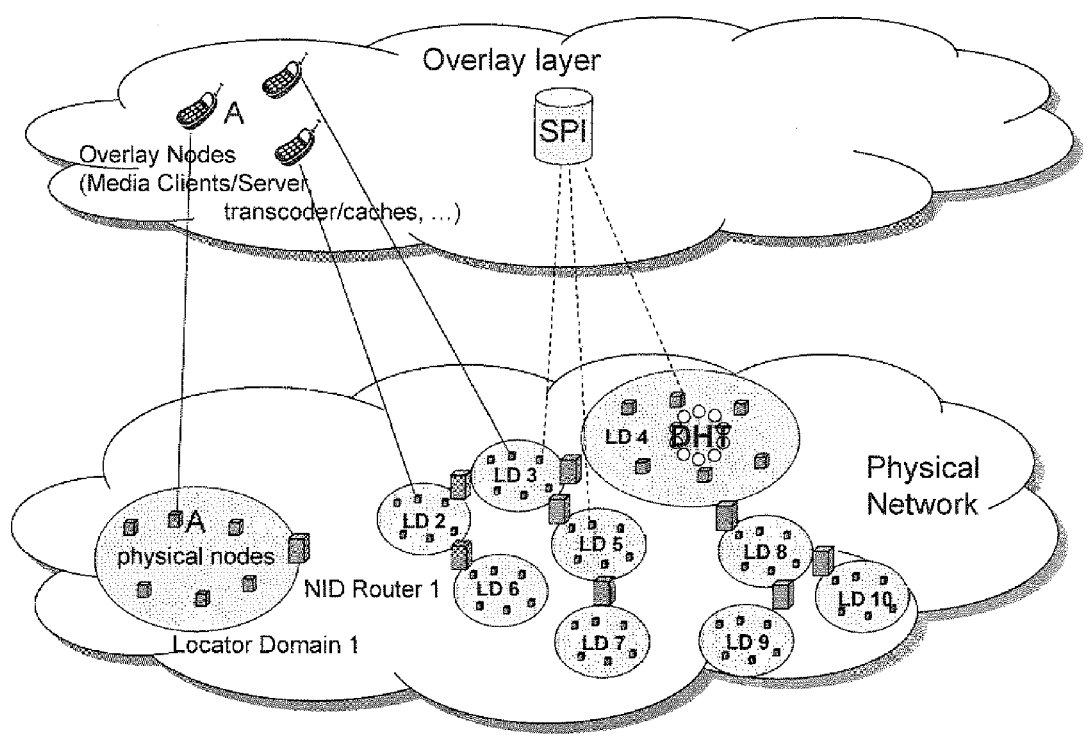
FIG. 5 shows a relation between a physical network as an underlying domain and a SATO as an example of an overlay domain.
Figure 6:
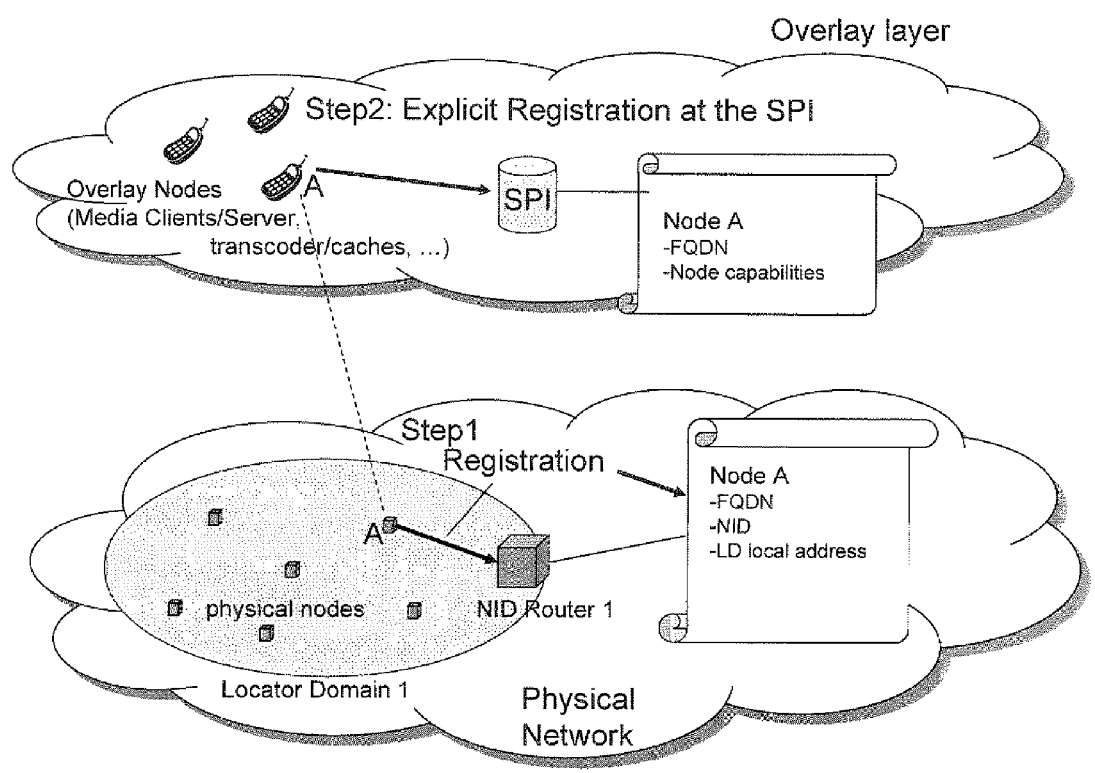
FIG. 6 shows the independent registration of nodes in an underlying network and an overlay network as known from the prior art.

FIG. 1 shows a basic embodiment of the invention. In a first step S1, a node of an underlying network, e.g. a physical network, registers with a dedicated registration node of the underlying network, e.g. a NodeID router. Then in step S2, the registration node of the underlying network propagates registration information towards the overlay network, e.g. a SATO network. By virtue of this concept, it is possible to provide dedicated overlay network registration information to the overlay network in an automatic procedure that does not require a node that acts on both the underlying and the overlay network to independently register on the two networks. Namely, some of the information already provided to the registration node of the underlying network can automatically be used for registration in the overlay network. In addition, specific information from the underlying network, such as topology information, can be automatically propagated from the registration node of the underlying network towards the overlay network. Such additional information can be useful for the tasks to be performed in the overlay network, e.g. media routing.

The registration information being propagated can be chosen in any suitable or desirable way, depending on the types of underlying and overlay networks to which the concept of the invention is being applied, and may e.g. comprise at least one of transport level and application-level information. Preferably, the node of the underlying network, which may also be an entity or node of the overlay network, registers overlay node capability information at the registration node, and the registration information propagated towards the overlay network comprises this overlay node capability information. In the case of a SATO overlay network, such overlay node capability can e.g. be QoS (Quality of Service) capabilities.

The registration information propagated towards the overlay network may also comprise topology information of the underlying network.

The node of the underlying network may e.g. register identity and address information for routing in the underlying network at the registration node. Such identity information may be a Node ID, and the address information may e.g. be a domain address and/or a FQDN.

The node of the underlying network may comprise multiple interfaces. This means that it e.g. has a WLAN and a GPRS/UMTS interface for communicating via a WLAN or via GPRS/UMTS. Each independent interface may have its own locator and FQDN. In this case, an embodiment of the invention envisages that the node may register preference information regarding the use of the multiple interfaces at the registration node. This interface preference information is then preferably also propagated towards the overlay network as a part of the registration information.

The overlay network can be structured in any suitable or desirable way, as long it can receive the registration information being propagated. According to a preferred example, the overlay network comprises a network topology creating node for receiving the registration information propagated towards the overlay network, and the network topology creating node is arranged for generating a network topology of at least a part of the underlying network from the received registration information. The registration information may generally be propagated towards a directory function of said overlay network, which directory function may additionally have the above mentioned topology creating capability. An example of such a directory function is the previously mentioned SATO-Port Informationbase function.

Such a directory function of said overlay network may be implemented at said registration node of the underlying network, or it may be implemented at a different node of said underlying network than said registration node. In the former case, the propagation of registration information may be a process of passing data internally between the registration function of the underlying network and the directory function of the overlay network. In the latter case, the propagation of registration information towards the overlay network may comprise forwarding the registration information from said registration node to said directory function of said overlay network.

If the directory function is implemented at a different node than the registration node of the underlying network, then the underlying network may comprise a plurality of registration nodes, and at feast one of said plurality of registration nodes of a propagation path along which the registration information is propagated may implement the directory function functionality.

If the directory function is implemented at a different node than the registration node of the underlying network, then alternatively or additionally the propagation of registration information towards the overlay network may comprise sending a reply with a pointer to the directory function from the registration node to said node of said underlying network, and said node of said underlying network may then register said registration information at said directory function directly.

The underlying network may comprise one or multiple domains. If there are multiple domains, e.g. locator domains, then the node of the underlying network can be comprised in a first domain and the registration information may be sent from the underlying network to the overlay network by a second registration node located in a second domain. The second and the first domain may be the same domain. Also, the first and the second registration node may be the same node.

The registration node of the underlying network may be chosen in any suitable or desirable way, e.g. it may have a routing functionality.

The overlay network may be any distinguishable overlay network, e.g. it can be a transport network comprising nodes that are service aware, such as e.g. a SATO network.

The present invention can also be embodied as a method of controlling a registration node of a domain of an underlying network, wherein the registration node is controlled to receive registration information related to a node of a first domain of the underlying network and to initiate a propagation of said registration information towards an overlay network for registering the node at the overlay network.

Equally, the present invention can be embodied as a method of controlling a network topology creating node of an overlay network, the network topology creating node being controlled to receive registration information related to multiple nodes of at least one domain of an underlying network, and to generate a network topology of at least a part of the underlying network from the received registration information.

The invention can also be embodied as a method for registering a node of an underlying network at an overlay network, the underlying network comprising multiple domains and the node being a node of a first domain, characterized in that the node of the underlying network registers at a registration node of the first domain, the registration node initiates a propagation of registration information towards the overlay network through at least a second registration node of a second domain of the underlying network.

All of the above indicated methods can be embodied as a computer program comprising code adapted to perform any of the steps of the recited methods when executed. For example, such a computer program can be executed on a registration node of the underlying and/or on a network topology creating node of an overlay network. The invention can also be embodied as a computer program product comprising such a computer program.

The present invention can also be embodied as hardware, e.g. as registration node of a domain of an underlying network characterized in that the registration node is adapted to receive registration information related to a node of a first domain of the underlying network and to initiate a propagation of said registration information towards an overlay network for registering the node at the overlay network. The node of the first domain may be a physical node.

The registration node may be arranged for propagating said registration information towards a directory function of said overlay network. The directory function of said overlay network may be implemented at said registration node.

If the directory function of said overlay network is implemented at a different node of said underlying network than said registration node, then the registration node may be arranged for forwarding the registration information from the registration node to said directory function of said overlay network. Additionally or alternatively, the registration node may be arranged for sending to said node of said first domain a reply with a pointer to the directory function.

The registration node may be arranged for receiving said registration information directly from said node of said first domain, and/or from another registration node.

The present invention can also be embodied as a network topology creating node of an overlay network, the network topology creating node being arranged for receiving registration information related to multiple nodes of at least one domain of an underlying network, the network topology creating node being adapted to generate a network topology of at least a part of the underlying network from the received registration information.

As already mentioned, the network topology creating node may implement a directory function of said overlay network. Additionally or alternatively, the network topology creating node may implement a registration functionality on an underlying network level.

Figure 15:
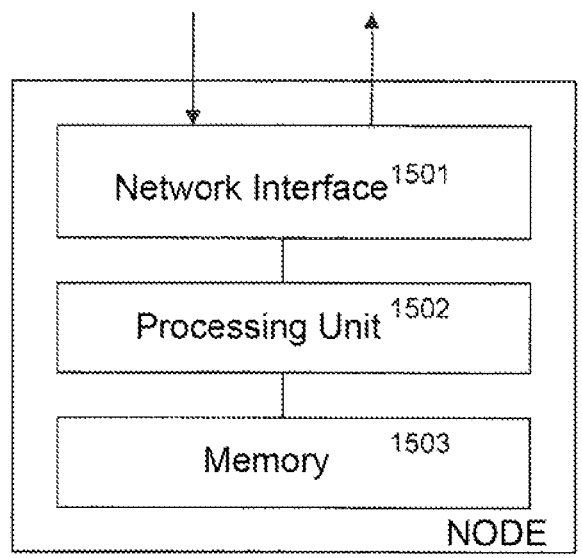
FIG. 15 shows a schematic example of a node that can act as an embodiment of the present invention.

FIG. 15 shows a basic structure of a node 150 according to the present invention. 1501 represents a communication part for receiving information from other nodes and sending information to other nodes. For example, this can be any known network interface, such as wireless communication equipment in the case of a mobile phone. 1502 represents a processing unit, such as a programmable processor, 1503 represents a memory for storing information received via communication part 1501 and computer programs for implementing the methods of the invention in processing unit 1502. Both the above mentioned registration node and network topology creating node can be embodied as shown in FIG. 15, using appropriate software for programming the processing unit 1502.

Using these basic embodiments, a number of important improvements can be achieved, some of which will now be described in the context of the AN system and SATO for better illustration, but without any restriction for the invention defined by the appended claims.

A mechanism e.g. usable for collecting and maintaining data about the network topology and the capabilities of the network nodes is proposed, based on the existing mechanisms and signaling procedures in an underlying network or layer such as the AN architecture. This reduces the effort and signaling traffic imposed by the mechanisms implementing the overlay support. In addition, the consistency of the data present in the different databases (e.g. SPI and NID DHT) can be assured.

It can be assumed that all ANs support the NodeID internetworking concept. Thus, we have a ubiquitously available mechanism that has the potential to provide some information that is required for the realization of overlay networks in terms of the characteristics and topology of the underlying connectivity plane. In other words, a minimum set of information for overlay network can be provided.

Nodes wishing to communicate in AN and also wishing to use the AN overlay service (SATO) are expected to use an extended registration procedure when registering their NodeID in the local locator domain. The extension relates to the provisioning of information about the nodes' features such as transcoding and caching capabilities, which are intended to be utilized when creating SATOs. In addition, the information of a node's location in the network topology is forwarded to the SPI. This extension can be implemented in different fashions:

SPI database maintained by the NID routers: In this case, the node registering to the NID architecture would include additional information in the registration message, for example about the node properties (e.g. available transcoding functionality). The registration message could e.g. be designed in a modular fashion, comparable to the Options in IP.

SPI database not maintained by the NID routers: When (e.g. for scalability reasons) the SPI database is not maintained by the NID routers, they can still be the point of contact for the SPI-related registration procedure. Additional mechanisms to propagate the topology information (and information about changes in topology) from the NID router to the SPI may be required in this case. Two options are thinkable:

Redirect: The NID routers replies with a pointer to the SPI and the node registers the information directly there.

Forwarding: The NID router forwards the information to the SPI.

The properties that the nodes register with the MD router and thus the SPI database may change over time. In this case, the properties are updated by an "update" message that is sent from the node to the NID router (in the case of SPI database maintained by the MD router or NID router forwards to SPI database) or directly to the SPI database (in case of re-direct).

When a node is multi-homed (multiple interfaces bound to one NID), the proposed procedure can additionally be used to register certain preferences regarding the usage of the different interfaces, e.g. which media type should be routed to which interface. These preferences are preferably also forwarded to the overlay network as a part of the registration information. In other words, the interface preferences may be information elements (like device capabilities) that are included in the registration at the node of the underlying network and then subsequently propagated towards the overlay network. The interface preferences can then e.g. be registered at the SPI database, i.e. in general at the directory function of the overlay network.

Figure 7:
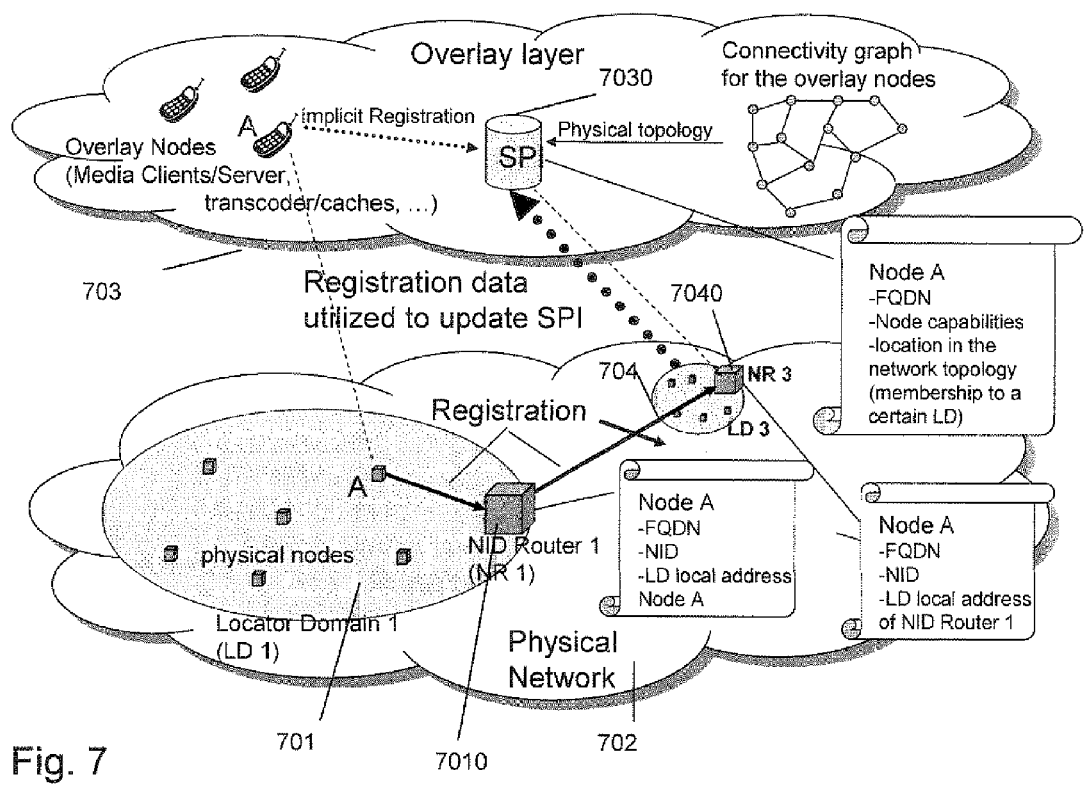
FIG. 7 shows an embodiment of the invention.

FIG. 7 shows the principle of an embodiment of the invention for the case of one LD referred to as LD1 or 701. A physical node A of the physical network 702, which implements the functionality of an overlay node and thus is visible in the overlay layer or overlay network 703, registers with the NIB router NR1 (7010) in its domain LD1. The information it registers is, as described before, its FQDN, its NodeID, its LD local address, and its overlay node capabilities. This information is stored in NID Router 1 except for the overlay node capabilities, which are directly forwarded to the SPI 7040, which is in this scenario implemented by NIB router 3, referred to as NR3 or 7040 and present in a further locator domain LD3 or 704. The registration data is propagated to the next higher NID Router in the hierarchy, in this example NID Router 3. During the propagation, the LD local address is, however, not propagated, but replaced by the LD local address of the NID router that propagated the information. NIB router 3 thus does not know the local LB address of Node A, but it knows its FQDN, its NodeID, and the LD local address of the NID router that propagated the information. Thus, if a message would need to be routed to Node A (as identified by FQDN or NodeID), NID Router 3 would route it to NID Router 1 for further delivery.

As we assume that NID Router 3 implements the SPI functionality (see further below for the case when this cannot be assumed), NID Router 3 now performs the "overlay level" registration, i.e. it registers Node A with its SPI functionality, by registering Node A's FQDN and capabilities. The SPI has received two separate registration messages from which it can construct the topology of the sub-tree in the NID architecture to which node A has registered. Thus, location and topology information pertaining to Node A is also registered in the SPI. Through registering on the physical layer, Node A is now automatically also registered on the overlay layer, and the SPI has additionally received network topology information. The explicit registration known from the state-of-the-art is not necessary any longer. An implicit registration is carried out instead through the utilization of the registration information provided in the registration process, which is taking place in the Node ID architecture on the physical network level. It should be noted that NID Router 3 itself may be part of a bigger network, and may further propagate the information about Node A.

It is emphasized that the first dashed line from node A on the physical layer to overlay node A on the overlay layer and the second dashed line denoted by "Implicit registration" have been introduced in FIG. 7 (and following figures) for mere illustrative purposes, i.e. to illustrate that the state-of-the-art explicit registration procedure that exactly follows these dashed lines can be skipped completely. According to the invention A is registered at the SPI via the sequence of nodeID routers as described which effects that A on the overlay layer is registered at the SPI.

In order to further explain the above described procedure an example is given, which is also already shown in FIG. 7. Within the NodeID architecture, locators have only significance and facilitate communication within its own local domain. Let's consider that IPv4 is used in LD1. In this case, Node A will register with its FQDN (e.g. A.EXAMPLE.COM), its LD local address i.e. its assigned IPv4 address, its NodeID and its overlay node capabilities (e.g. a transcoding node with detailed description of the supported media types and formats, codecs and bit rates). NID Router 3 registers Node A to its corresponding SPI by registering Node A's FQDN (e.g. A.EXAMPLE.COM), its capabilities and its membership to a certain LD. Taken into account that several physical nodes with overlay node functionality are registered with their location in the physical network topology (i.e. with their belonging LD) at the SPI, a topology graph of the overlay nodes could be produced. In case of using IPv4 in the LD even further topology information could be extracted. Since IPv4 uses a hierarchical address scheme, the IPv4 address itself contains information about the internal topology within the LD. If this information is forwarded to the SPI as part of the overlay node capabilities, even internal topology information about a LD is available for constructing the topology graph of the overlay nodes.

Figure 8:
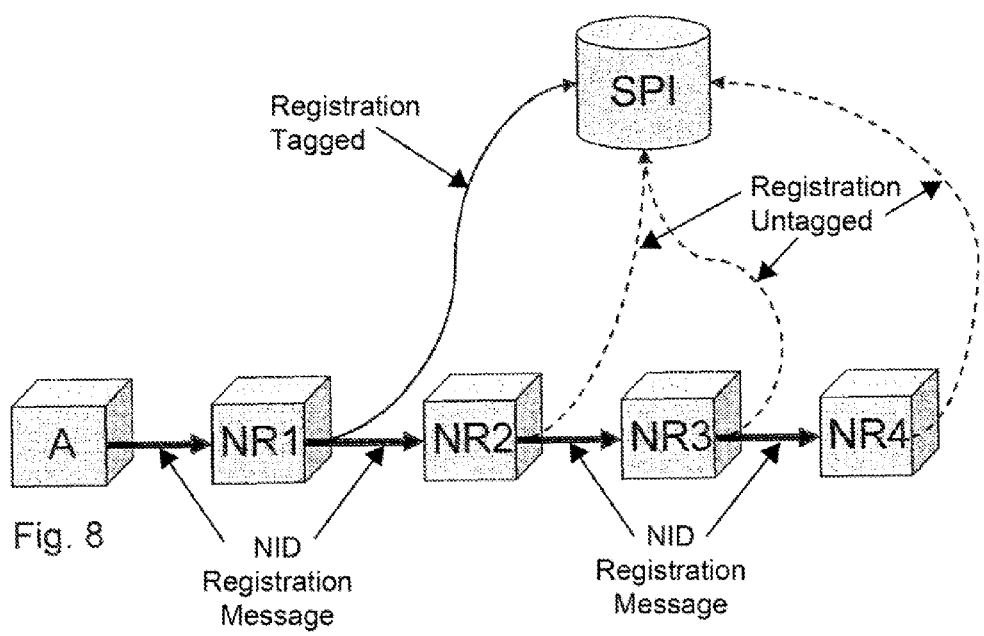
FIG. 8 shows both the concepts of a single registration with an SPI as well as multiple SPI registrations.
Figure 9:
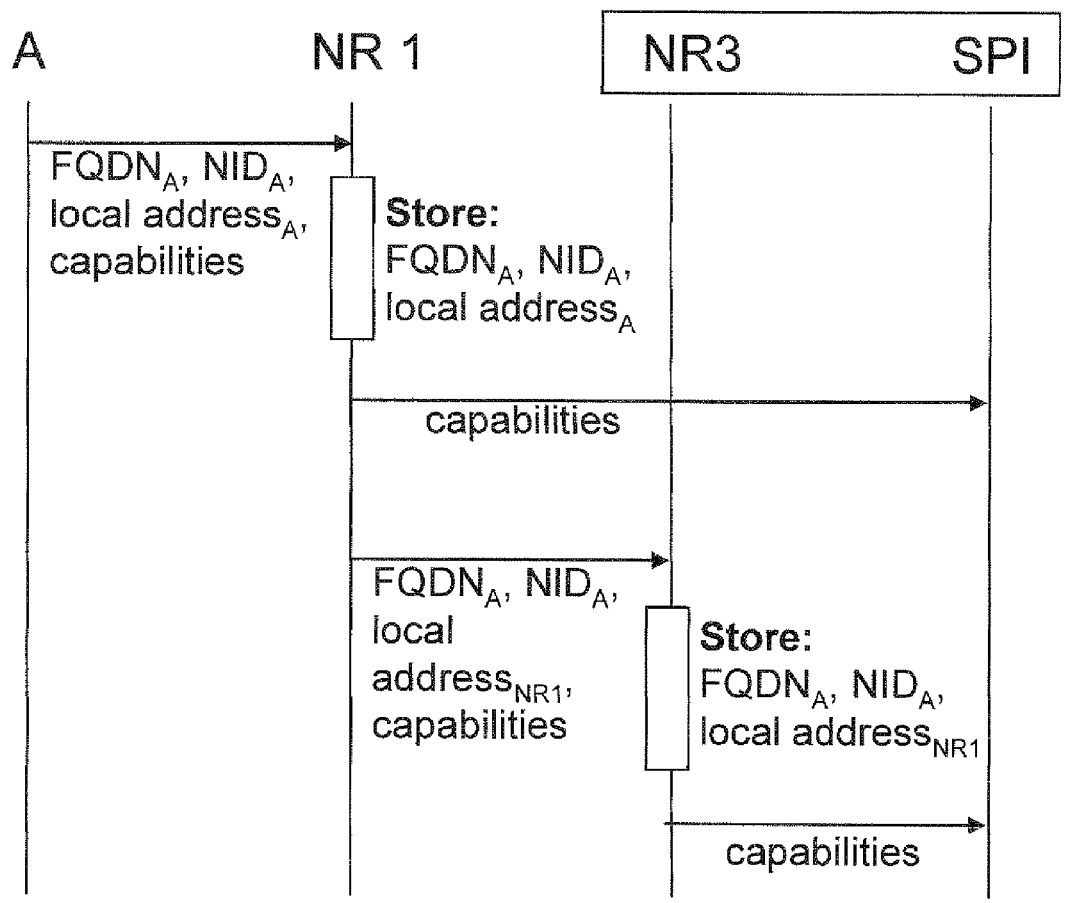
FIG. 9 shows a sequence chart of the registration procedure carried out for the scenario depicted in FIG. 7.

As shown in FIG. 8, the previously described scenario can be generalized as a sequence of registration processes carried out by the NID routers (NR). The strong solid lines in FIG. 8 represent the usual NID registration messages. Regarding the information sent to the SPI, two options exist: The information about nodes As capabilities could in one variant be tagged as already registered in the SPI after the first SPI registration has been carried out in order to avoid multiple registrations (which should however not be harmful). In this case, only the SPI registration represented by the thin solid line in the figure would be executed. In the other variant, the registration is not tagged and will consequently be registered multiple times (see additional dashed lines in FIG. 8), posing requirements on recognition and conflict resolution in the distributed SPI. FIG. 9 shows the just described sequence of messages of the registration procedure carried out for the scenario depicted in FIG. 7.

Figure 10:
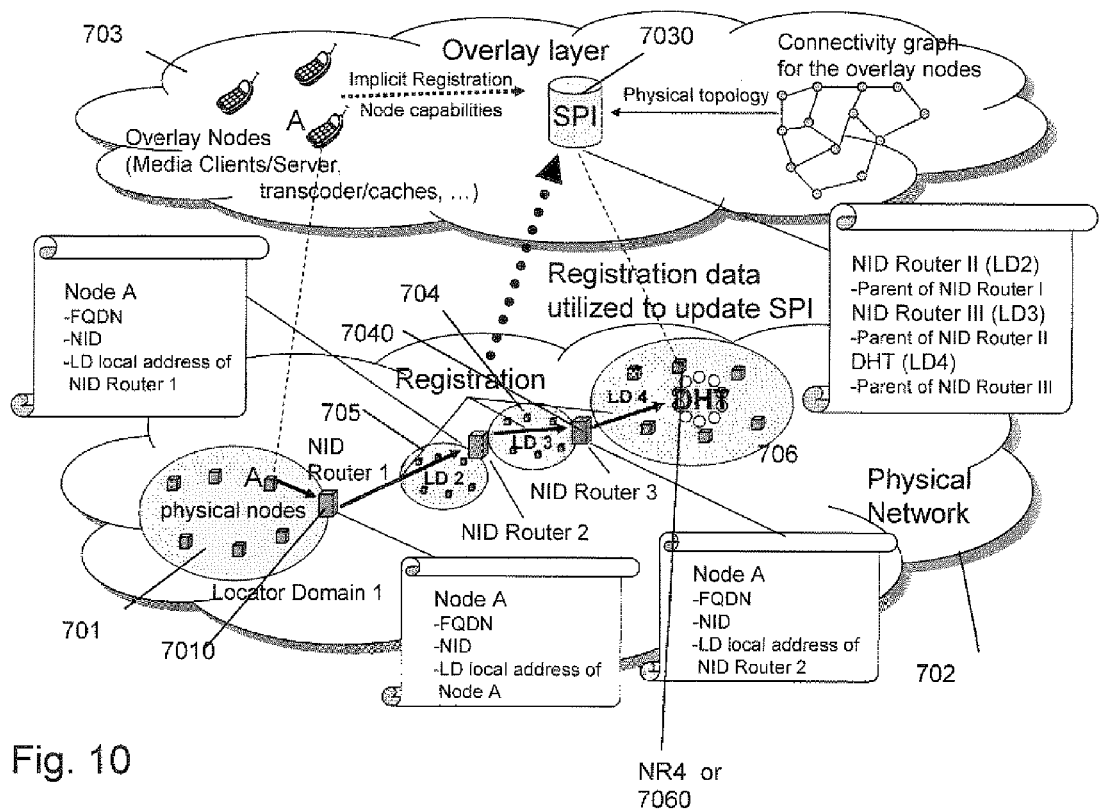
FIG. 10 shows a further embodiment of the invention.

FIG. 10 slightly extends the previous case by showing the case where there is a multi-level hierarchy of LDs. The same reference numerals as in FIG. 10 are used, and additional locator domains LD2 and LD4 are respectively referred to as 705 and 706. That means the Node A information is propagated several levels to the top, until it reaches NID Router 4, also referred to as NR4 or 7060. MD Router 4 has SPI functionality and registers Node A in the SPI, as described before.

Figure 11:
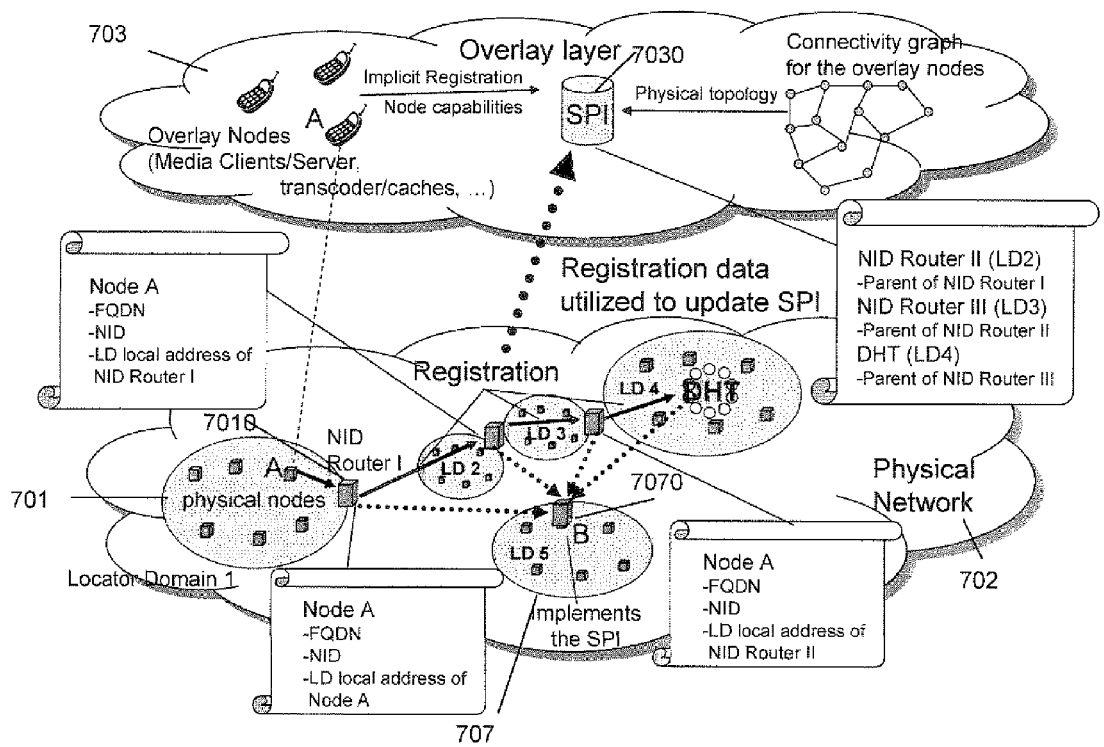
FIG. 11 shows another embodiment of the invention.

FIG. 11 extends the previous case for the (more likely) case when LD4 does not have SPI functionality. However, it has an overview of all nodes in its tree, and thus also knows which of those nodes have SPI functionality. It knows that in LD 5 (which is also referred to as 707 and is in the NID Router 4 realm) there is a node B (NID Router or other node referred to 7070) that has SPI functionality. It sends the registration data for Node A down to Node B for registration. Node B registers Node A into the SPI. Thus, (overlay) Node A is completely made known on the overlay level, with its capabilities and FQDN and NodeID.

The previous examples used sequentially arranged NodeID routers. The routing information has been propagated along a propagation path of multiple NodeID routers until a NodeID router has been found that has SPI functionality. A special case is when the first NodeID 1 already has SPI functionality. In this special case the NodeID 1 router may directly turn to the SRI of the overlay layer for the registration of node A, i.e. node A may be registered at NodeID 1 first as described previously but will then (without further propagation of registration information through the underlying physical network) directly registered from the NodeID1 at the SPI of the overlay network.

Figure 12:
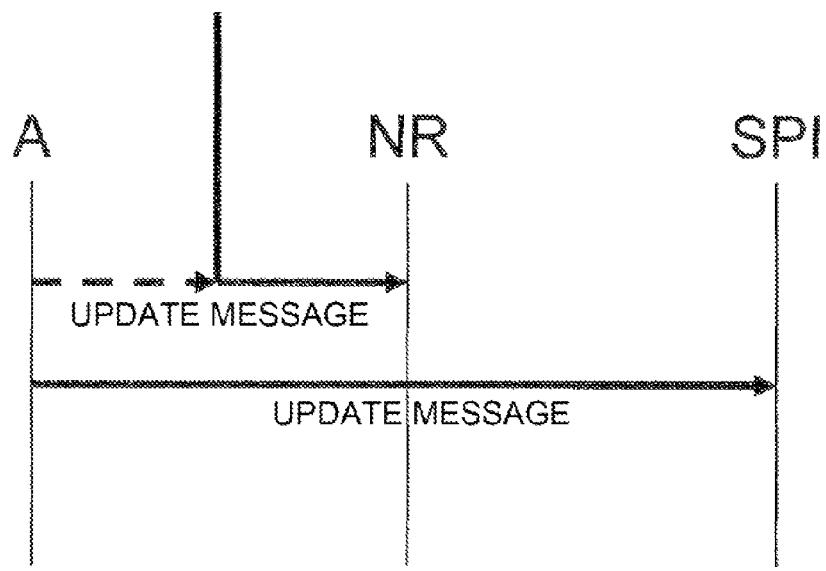
FIG. 12 shows the basic procedure of mobility updates according to the state of the art.

In the case of mobility events, the combination of NID registration and SPI registration has another significant advantage. As outlined in FIG. 12, the current way to update the Node ID-based routing is triggered by a message to the NID router (NR). This can be initiated by the node A itself (see dashed line), but also from other entities, e.g. when an entire network changes its point of attachment (network mobility). In either case, the individual node is responsible for the corresponding SRI updates. Especially in the latter case, when it is thinkable that node A has not even noticed the mobility event, this might lead to inconsistencies in the SPI database.

Figure 13:
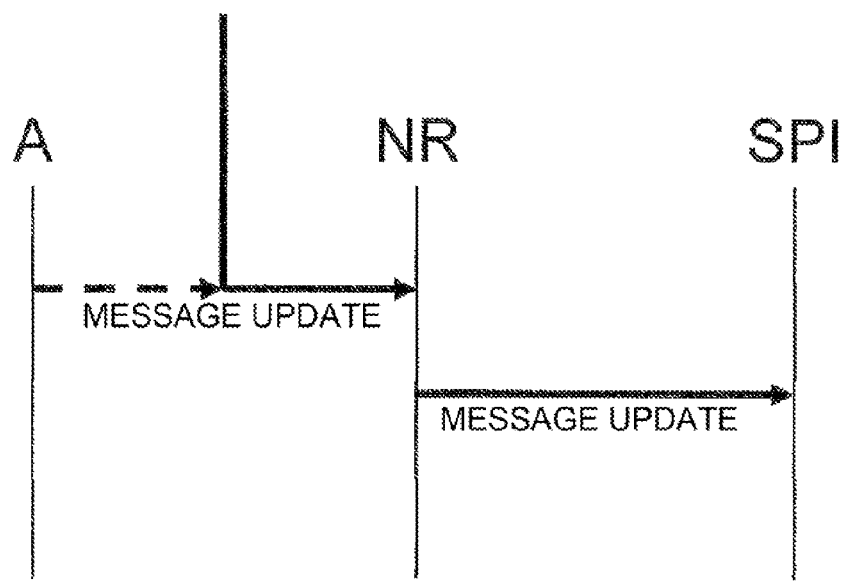
FIG. 13 shows the basic procedure of mobility updates according to an embodiment of the invention.

With the proposed registration scheme, the NID router ensures that the SRI and the NID routing data remain consistent. As outlined in FIG. 13, the update of the SPI information is triggered by the NID Router and not by the node itself. Thus, even if the node does not notice the topology change, it can still be guaranteed that the SPI information remains up to date.

The description of the invention above assumed that only one overlay layer exists to which the nodes can register. This served to more clearly describe the disclosed concepts. This limitation might restrict the possible business cases that could be implemented and we thus foresee an addition to the schemes described before to direct the registration towards a specific overlay layer for the case multiple of them exist. In other words, the concepts of the invention are also equally and fully applicable in a context having more than one overlay network.

Figure 14:
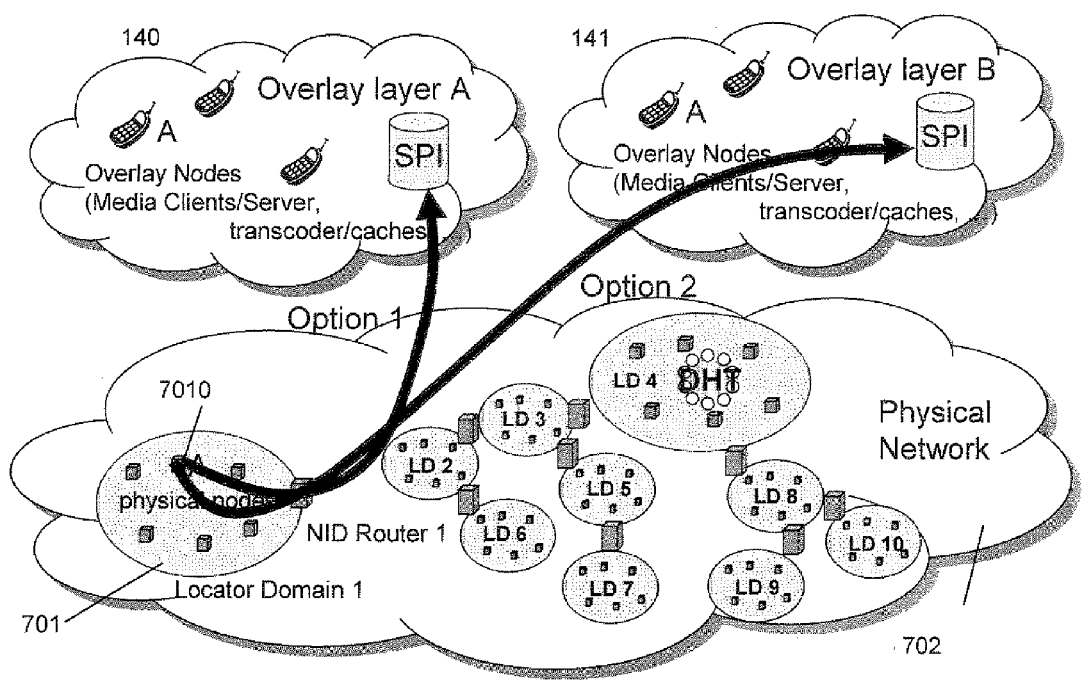
FIG. 14 shows an example of directing a registration towards a specific overlay layer in case multiple overlay layers exist.

To determine an overlay layer, node A (7010) in FIG. 14 adds an Overlay Layer Identifier to its registration message on the physical network level to determine whether the registration at the overlay layer has to be executed with either of the available overlay layers A or B, referred to as 140 and 141, respectively. Although the scenario depicted in FIG. 14 only shows two available overlay layers 140 and 141, this does not exclude the general case for which an undetermined number of overlay layers is assumed. In the simple scenario of FIG. 14, node A thus decides whether the registration is executed with overlay layer A (140) or overlay layer B (141), see Option 1 or Option 2 in FIG. 14.

The mechanism described in this section is orthogonal to the concepts described so far. In other words, any of the described features could thus be enhanced by the functionality described in connection with plural overlay networks. Consequently, the propagation of the registration information towards one or both of the overlay layers 140 and 141 can be performed in accordance with any of the previously described methods, e.g. any of the methods described in connection with one of FIGS. 7 to 13.

As already mentioned, the present invention also concerns computer programs comprising portions of software codes in order to implement the methods as described when operated at a registration node like a NodeID router or a SPI function (e.g. for topology creation). The respective computer programs can be stored on one or more computer readable media. A computer-readable medium can be a permanent or rewritable memory within a registration node or a SPI function, or located externally. The respective computer programs can be also transferred to the respective entities for example via a cable or a wireless link as a sequence of signals.

The invention has been described with Ambient Network terminology. It is apparent to the skilled person that the inventive concepts of the invention may be embodied in further networks comprising an overlay and underlying layer structure. The invention is defined by the appended claims.

The invention claimed is:

1. A method for registering a node of an underlying network at an overlay network, comprising:
registering the node of the underlying network at a registration node of the underlying network by registering the node's Locator Domain (LD) independent Fully Qualified Domain Name (FQDN), the node's independent Node Identity (NID) and the node's local address, the registration node being comprised in a same domain as the node of the underlying network;
initiating with the registration node a propagation of registration information towards the overlay network, including the node's FQDN and overlay node capabilities including transcoding capabilities, the registration node sending the registration information from the underlying network to the overlay network, and registering preference information regarding the use of multiple interfaces of said node of the underlying network at said registration node.

2. The method according to claim 1, wherein the registration information comprises at least one of transport level and application-level information.

3. The method according to claim 1, said node of said underlying network registering identity and address information for routing in said underlying network at said registration node.

4. The method of claim 3, wherein said identity information is a Node ID, and said address information is a domain address.

5. The method according to claim 1, wherein said node of the underlying network registers overlay node capability information at said registration node and said registration information propagated towards the overlay network comprises said overlay node capability information.

6. The method according to claim 1, wherein said registration information propagated towards said the overlay network comprises topology information of said underlying network.

7. The method according to claim 1, wherein said overlay network comprises a network topology creating node for receiving the registration information propagated towards the overlay network, and the network topology creating node generating a network topology of at least a part of the underlying network from the received registration information.

8. The method of claim 1, wherein the registration information is propagated towards a directory function of said overlay network.

9. The method of claim 8, wherein said directory function of said overlay network is implemented at said registration node.

10. The method of claim 8, wherein said directory function of said overlay network is implemented at a different node of said underlying network than said registration node.

11. The method of claim 10, wherein said propagation of registration information towards the overlay network comprises forwarding the registration information from said registration node to said directory function of said overlay network.

12. The method according to claim 11, wherein said underlying network comprises a plurality of registration nodes, and at least one of said plurality of registration nodes in a propagation path along which the registration information is propagated implements the directory function functionality.

13. The method of claim 10, wherein said propagation of registration information towards the overlay network comprises sending a reply with a pointer to the directory function from the registration node to said node of said underlying network, and said node of said underlying network registering said registration information at said directory function directly.

14. The method according to claim 1, wherein the underlying network comprises multiple domains.

15. The method according to claim 1, wherein the registration node has a routing functionality.

16. The method according to claim 1, wherein said overlay network is a transport network comprising nodes that are service aware.

17. The method according to claim 1, wherein said node of the underlying network includes an overlay layer identifier in a registration message to said registration node.

18. A method of controlling a registration node of a domain of an underlying network, comprising:
controlling the registration node to receive registration information related to a node of the underlying network by registering the node's Locator Domain (LD) independent Fully Qualified Domain Name (FQDN), the node's independent Node Identity (NID) and the node's local address, the registration node being comprised in the same domain as the node of the underlying network; and
initiating a propagation of said registration information towards an overlay network, including the node's FQDN and overlay node capabilities including transcoding capabilities for registering the node at the overlay network, wherein the registration node sends the registration information from the underlying network to the overlay network, and wherein said node of the underlying network comprises multiple interfaces, the registration node being controlled to receive preference information regarding the use of the multiple interfaces.

19. The method according to claim 18, wherein the node of the first domain is a physical node.

20. A method of controlling a network topology creating node of an overlay network, comprising:
controlling the network topology creating node to receive registration information related to multiple nodes of at least one domain of an underlying network including each node's Locator Domain (LD) independent Fully Qualified Domain Name (FQDN), each node's independent Node Identity (NID), each node's local address and overlay node capabilities including transcoding capabilities, and
generating a network topology of at least a part of the underlying network from the received registration information, at least one of the multiple nodes of the underlying network being comprised in the same domain as a registration node in the underlying network that sends the registration information to the network topology creating node.

21. A registration node of a domain of an underlying network, the registration node comprising:
a network interface which receives registration information related to a node of the underlying network by registering the node's Locator Domain (LD) independent Fully Qualified Domain Name (FQDN), the node's independent Node Identity (NID) and the node's local address, the registration node being comprised in a same domain as the node of the underlying network; and
a processor which initiates a propagation of said registration information, including the node's FQDN and overlay node capabilities including transcoding capabilities towards an overlay network for registering the node at the overlay network, wherein the registration node sends the registration information from the underlying network to the overlay network, and
wherein said node of the underlying network comprises multiple interfaces, and the network interface receives preference information regarding the use of the multiple interfaces.

22. The registration node according to claim 21, wherein the node of the first domain is a physical node.

23. The registration node according to claim 21, said registration node being arranged for propagating said registration information towards a directory function of said overlay network.

24. The registration node according to claim 23, wherein said directory function of said overlay network is implemented at said registration node.

25. The registration node according to claim 23, wherein said directory function of said overlay network is implemented at a different node of said underlying network than said registration node, and wherein said registration node is arranged for forwarding the registration information from said registration node to said directory function of said overlay network.

26. The registration node of claim 23, wherein said registration node is arranged for sending to said node of said first domain a reply with a pointer to the directory function.

27. The registration node according to claim 21, wherein said registration node is arranged for receiving said registration information directly from said node of said first domain, or from another registration node.

28. A network topology creating node of an overlay network, the network topology creating node comprising:
   a network interface for receiving registration information, including the node's Locator Domain (LD) independent Fully Qualified Domain Name (FQDN), the node's independent Node Identity (NID) and the node's local address and overlay node capabilities including transcoding capabilities related to multiple nodes of at least one domain of an underlying network; and
   a processor which generates a network topology of at least a part of the underlying network from the received registration information, at least one of the multiple nodes of the underlying network being comprised in the same domain as a registration node in the underlying network that sends the registration information to the network topology creating node.

29. The network topology creating node of claim 28, wherein said network topology creating node implements a directory function of said overlay network.

30. The network topology creating node of claim 28, wherein said network topology creating node implements a registration functionality on an underlying network level.

* * * * *

UNITED STATES PATENT AND TRADEMARK OFFICE
CERTIFICATE OF CORRECTION

PATENT NO. : 8,737,261 B2  
APPLICATION NO. : 12/516162  
DATED : May 27, 2014  
INVENTOR(S) : Schieder et al.

Page 1 of 2

It is certified that error appears in the above-identified patent and that said Letters Patent is hereby corrected as shown below:

In the Specification

In Column 1, Line 13, delete "(MD)" and insert -- (NID) --, therefor.

In Column 1, Line 57, delete "Internet, The" and insert -- Internet. The --, therefor.

In Column 2, Line 2, delete "2)," and insert -- 2). --, therefor.

In Column 2, Line 62, delete "resiting," and insert -- resizing, --, therefor.

In Column 5, Line 63, delete "invention, However," and insert -- invention. However, --, therefor.

In Column 7, Line 13, delete "at feast" and insert -- at least --, therefor.

In Column 9, Line 41, delete "MD" and insert -- NID --, therefor.

In Column 9, Line 45, delete "MD" and insert -- NID --, therefor.

In Column 9, Line 65, delete "NIB" and insert -- NID --, therefor.

In Column 10, Line 3, delete "NIB" and insert -- NID --, therefor.

In Column 10, Line 10, delete "NIB" and insert -- NID --, therefor.

In Column 10, Line 10, delete "LB" and insert -- LD --, therefor.

In Column 10, Line 45, delete "nodeID" and insert -- NodeID --, therefor.

In Column 11, Line 9, delete "nodes As" and insert -- nodes A's --, therefor.

Signed and Sealed this  
Fourteenth Day of July, 2015

Michelle K. Lee  
*Director of the United States Patent and Trademark Office*

CERTIFICATE OF CORRECTION (continued)
U.S. Pat. No. 8,737,261 B2

In Column 11, Line 27, delete "MD" and insert -- NID --, therefor.

In Column 11, Line 46, delete "SRI" and insert -- SPI --, therefor.

In Column 11, Line 60, delete "SRI" and insert -- SPI --, therefor.

In Column 11, Line 65, delete "SRI" and insert -- SPI --, therefor.